(12) United States Patent
Duftler et al.

(10) Patent No.: US 8,949,804 B2
(45) Date of Patent: *Feb. 3, 2015

(54) LIMITING EXECUTION OF SOFTWARE PROGRAMS

(75) Inventors: Matthew Jason Duftler, Mahopac, NY (US); Douglas Charles Lovell, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,037

(22) Filed: Sep. 14, 2012

(65) Prior Publication Data

US 2013/0014257 A1    Jan. 10, 2013

Related U.S. Application Data

(63) Continuation of application No. 13/036,440, filed on Feb. 28, 2011.

(51) Int. Cl.
    *G06F 9/45*     (2006.01)
    *G06F 11/00*     (2006.01)
    *G06F 21/52*     (2013.01)

(52) U.S. Cl.
    CPC .................................. *G06F 21/52* (2013.01)
    USPC ........................................ 717/143; 726/23

(58) Field of Classification Search
    CPC .............. G06F 21/544; G06F 21/562–21/563; G06F 21/566; G06F 21/577
    USPC ........................................ 717/143; 726/23
    See application file for complete search history.

(56) References Cited

U.S. PATENT DOCUMENTS

| 5,398,196 | A | * | 3/1995 | Chambers ..................... 714/28 |
| 6,353,923 | B1 | | 3/2002 | Bogle et al. |
| 6,883,144 | B2 | | 4/2005 | Zielinski et al. |
| 7,222,066 | B1 | | 5/2007 | Oon |
| 8,042,184 | B1 | * | 10/2011 | Batenin ......................... 726/24 |
| 2005/0055565 | A1 | * | 3/2005 | Fournet et al. ................ 713/200 |
| 2005/0172338 | A1 | * | 8/2005 | Sandu et al. .................... 726/22 |
| 2007/0113282 | A1 | * | 5/2007 | Ross .............................. 726/22 |
| 2009/0119768 | A1 | * | 5/2009 | Walters et al. ................ 726/12 |
| 2009/0300764 | A1 | * | 12/2009 | Freeman ........................ 726/24 |
| 2010/0017880 | A1 | * | 1/2010 | Masood ......................... 726/24 |

(Continued)

OTHER PUBLICATIONS

Ellison, et al., "Supply-Chain Risk Management: Incorporating Security into Software Development," IEEE, 2010, 10pg.*

(Continued)

*Primary Examiner* — Ryan Coyer
(74) *Attorney, Agent, or Firm* — Preston J. Young; Ryan, Mason & Lewis, LLP (57) ABSTRACT

Techniques are disclosed for limiting execution of software programs. For example, a method comprises the following steps. A first set of program code is extracted from a second set of program code. The extracted first set of program code is parsed to generate a parsed structure. The parsed structure generated from the first set of program code is examined for one or more expressions predetermined to be unsafe for execution. The one or more expressions predetermined to be unsafe for execution that are contained in the first set of program code are detected. In one example, the first set of program code may be a script generated with the JavaScript™ scripting language and the second set of program code may be a business process.

14 Claims, 5 Drawing Sheets

(56) References Cited

U.S. PATENT DOCUMENTS

| | | | |
|---|---|---|---|
| 2010/0088679 A1 | 4/2010 | Langworthy et al. | |
| 2010/0306851 A1* | 12/2010 | Zhou | 726/25 |
| 2011/0197177 A1* | 8/2011 | Mony | 717/115 |
| 2011/0239294 A1* | 9/2011 | Kim et al. | 726/22 |

OTHER PUBLICATIONS

Vijayalekshmi, et al., "Fending Financial Transaction from Phishing Attack," IEEE, 2010, 5pg.*

A. Sah et al., "A New Architecture for the Implementation of Scripting Languages," Proceedings of the USENIX, Very High Level Languages Symposium (VHLLS), Sep. 1994, 18 pages.

L. Prechelt, "Are Scripting Languages Any Good? A Validation of Perl, Python, Rexx, and Tcl Against C, C++, and Java," Aug. 2002, 62 pages.

S. Maffeis et al., "Isolating JavaScript with Filters, Rewriting, and Wrappers," Computer Security—ESORICS, Lecture Notes in Computer Science, 2009, pp. 505-522, vol. 5789.

Q. Liu et al., "Function-Defined Shape Metamorphoses in Visual Cyberworlds," International Journal of Computer Graphics, Nov. 2006, 14 pages, vol. 22, No. 12.

H.J. Wang et al., "Shield: Vulnerability-Driven Network Filters for Preventing Known Vulnerability Exploits," ACM SIGCOMM, Proceedings of the 2004 Conference on Applications, Technologies, Architectures, and Protocols for Computer Communications, Session 5: Secure Networks, Oct. 2004, pp. 193-204, vol. 34, No. 4.

M.S. Miller et al., "Caja: Safe Active Content in Sanitized JavaScript," Jan. 2008, 26 pages.

"JSLint: The JavaScript Code Quality Tool," 2002, http://www.jslint.com/lint.html, 9 pages.

B. Livshits et al., "Gatekeeper: Mostly Static Enforcement of Security and Reliability Policies for JavaScript Code," ACM Proceedings of the 18th Conference on USENIX Security Symposium, MSR-TR-2009-16, 2009, 35 pages.

S. Maffeis et al., "Language-Based Isolation of Untrusted JavaScript," 22nd IEEE Computer Security Foundations Symposium, Jul. 2009, pp. 77-91.

C. Reis et al., "BrowserShield: Vulnerability-Driven Filtering of Dynamic HTML," ACM Transactions on the Web (TWEB), Sep. 2007, 14 pages, vol. 1, No. 3.

M. Teraguchi et al., "Optimized Active Content Filtering from HTML Documents with Scope Limitation," IBM Research Report, Aug. 2008, 6 pages.

"ADSafe: Making JavaScript Safe for Advertising," http://www.adsafe.org/, accessed on Feb. 18, 2011, 4 pages.

* cited by examiner

```
1.  var s = "abcdefg";
2.  s.slice(0,4);
3.  s.slice(2,4);
4.  java = Packages.java;
5.  jstr = new Packages.java.lang.String("Hello");
6.  jstr.slice(3);
7.  jstrToo = new java.lang.String("Hi!");
8.  jstrToo.slice(1);
9.  s.slice(4);
10. s.slice(3,-2);
11. s.prototype.slice = function() { return "foo"; };
12. String.prototype.valueof = function() { return "fooI"; };
13. s.slice(3);
14. var t = "hijk";
15. t.slice(2) ;
16. fusc = {"1":"first","2":"second","o":s};
17. fusc.o.prototype.slice = function() { return "baa"; };
18. t.slice(2) ;
19. String.prototype = s;
```

FIG. 6

600 slice.js is not compliant:
Call at line 2
Call at line 3
Java at line 4
Java at line 5
Call at line 6
Java at line 7
Call at line 8
Call at line 9
Call at line 10
Prototype assignment at line 11
Function at line 11
Prototype assignment at line 12
Function at line 12
Call at line 13
Call at line 15
Prototype assignment at line 17
Function at line 17
Call at line 18
Prototype assignment at line 19

LIMITING EXECUTION OF SOFTWARE PROGRAMS

CROSS-REFERENCE TO RELATED APPLICATION

This application is a Continuation of U.S. patent application Ser. No. 13/036,440, filed on Feb. 28, 2011, the disclosure of which is incorporated herein by reference.

FIELD

The field relates to scripting languages and script execution and, more particularly, to limiting execution of software programs which include undesirable or malicious software code or scripts associated with such programs.

BACKGROUND

Many web-based programming environments, such as Hypertext Markup Language (HTML), Business Process Execution Language (BPEL), and Business Process Markup Notation 2.0 (BPMN 2.0), provide fields that accept a set of expressions or script written with a scripting language such as JavaScript™ (Oracle Corporation, Redwood Shores, Calif.) or an expression language such as XPATH. A "script," therefore, is a program or sequence of instructions (e.g., software code) that is said to be, or considered to be, executed or carried out by another program rather than by a computer processor (cf., a compiled program).

Those programming environments that allow scripting languages provide a potential for any kind of program to run within their execution (runtime) environment. Unfortunately, this might include undesirable or malicious programs.

For example, cloud computing environments include shared resources open to subscribers or registered users. Thus, a "cloud" is generally known to be a shared computing environment. The National Institute of Standards and Technology (NIST) provides an illustrative definition (version 15 dated October 2009) of "cloud computing" as a model for enabling convenient, on-demand network access to a shared pool of configurable computing resources (e.g., networks, servers, storage, applications, and services) that can be rapidly provisioned and released with minimal management effort or service provider interaction.

It is known that services available for deploying business processes in the cloud allow users to create and deploy their own programs. Such programs are capable of having undesirable or even malicious effects on the computing environment in which they are executed.

For example, such programs may intentionally or unintentionally contain infinite loops and other logic errors that prevent termination. Users billed for the service by usage might have an unpleasant surprise after deploying a process that has an infinite loop error. A malicious user could test the boundaries of system usage with a denial of service attack, consuming resources that would otherwise be available for legitimate users. The combination of business processes and cloud deployment creates risk from both legitimate and malicious users. First, non-technical people may create business processes and may be more likely than technical professionals to inadvertently inject undesirable behavior. Second, the runtime environment is accessible to many with more or less stringent controls.

SUMMARY

Principles of the invention provide techniques for limiting execution of software programs including unsafe program code.

For example, in one aspect of the invention, a method comprises the following steps. A first set of program code is extracted from a second set of program code. The extracted first set of program code is parsed to generate a parsed structure. The parsed structure generated from the first set of program code is examined for one or more expressions predetermined to be unsafe for execution. The one or more expressions predetermined to be unsafe for execution that are contained in the first set of program code are detected.

The detecting step may further comprise flagging each of the one or more expressions predetermined to be unsafe for execution that are contained in the first set of program code.

The method may further comprise displaying the one or more expressions predetermined to be unsafe for execution that are contained in the first set of program code.

The method may further comprise preventing execution of the one or more expressions predetermined to be unsafe for execution that are contained in the first set of program code.

The method may further comprise preventing execution of the second set of program code when at least one of the one or more expressions predetermined to be unsafe for execution are detected in the first set of program code.

The parsed structure may comprise a parsed tree structure. The second set of program code may comprise a business process or a web page. The first set of program code may comprise a segment of code generated using a scripting language such as, by way of example, JavaScript™.

The one or more expressions predetermined to be unsafe for execution may comprise one or more of: a function call expression; a function definition expression; a goto expression; a while expression; a for expression; a property read expression; a property write expression; and a prototype assignment expression.

The second set of program code may be deployable in a shared computing environment, e.g., a cloud computing environment.

These and other objects, features, and advantages of the present invention will become apparent from the following detailed description of illustrative embodiments thereof, which is to be read in connection with the accompanying drawings.

DETAILED DESCRIPTION

It to be appreciated that, while illustrative embodiments of the invention will be described herein in the context of the JavaScript™ scripting language, principles of the invention are not limited to that or any particular scripting language. Examples of other scripting environments or languages in which principles of embodiments of the invention may be implemented include, but are not limited to, Ruby™ (Yukihiro Matsumoto), Python™ (Python Software Foundation), PHP™ (PHP Group), Perl™ (Perl Foundation), Bash™ (Free Software Foundation), XQuery™ (W3C), BPMN™ (Object Management Group), BPEL™ (OASIS), and SQL™ (Structured Query Language, ANSI).

Before describing illustrative principles of embodiments of the invention, we provide a few examples of processes (computer programs) which contain one or more scripts that may result in undesirable and/or malicious behavior.

Figure 1:
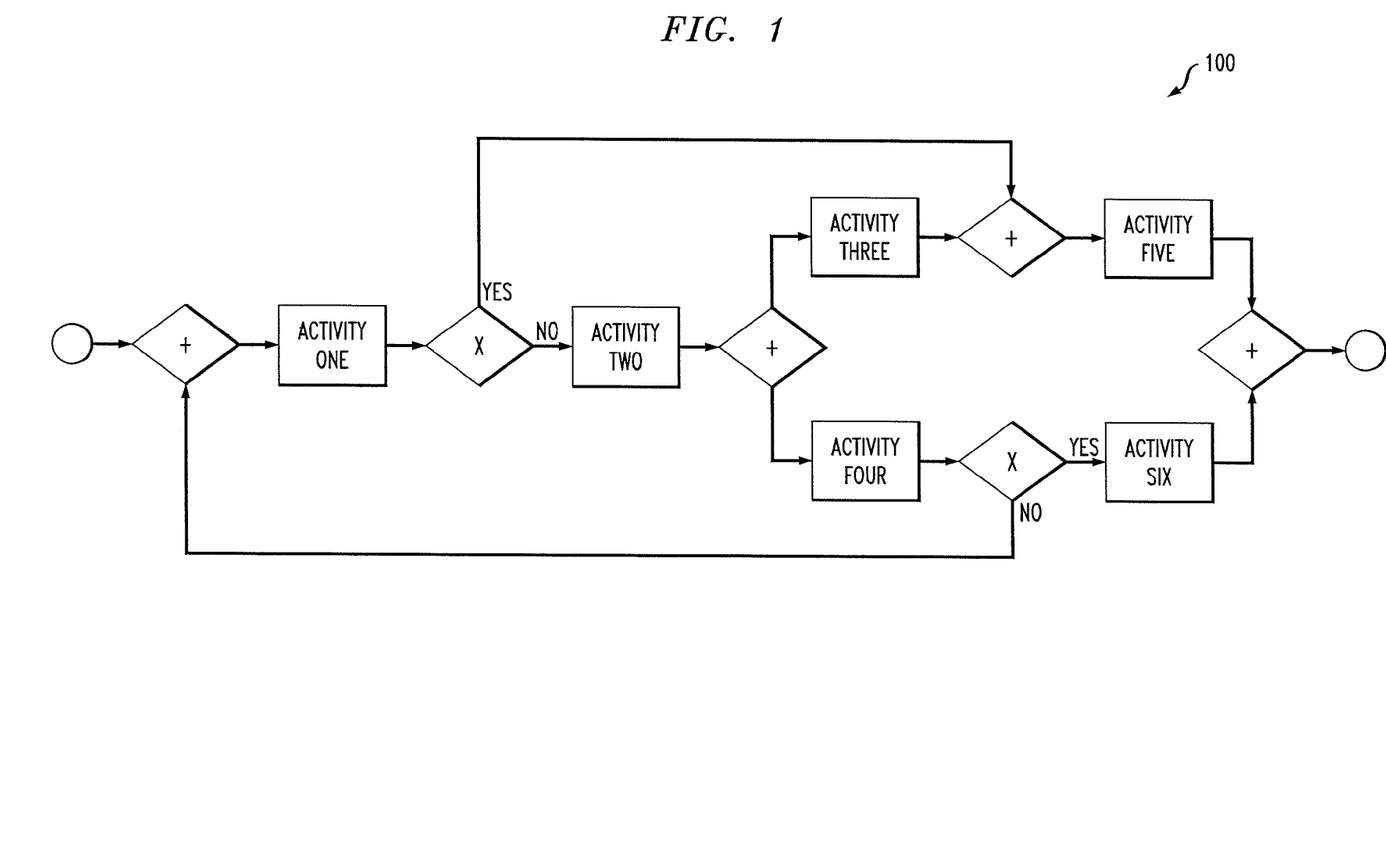
FIG. 1 illustrates an example of a process which contains one or more scripts that may result in undesirable behavior.

FIG. 1 illustrates an example of a process which contains one or more scripts that may result in undesirable behavior. More particularly, FIG. 1 shows a BPMN 2.0 diagram 100 representing a sample business process. The sample process is adapted from D. Fahland et al., Instantaneous Soundness Checking of Industrial Business Process Models, BPM '09: Proceedings of the 7th International Conference on Business Process Management, pages 278-293, Springer-Verlag, Berlin, Heidelberg, 2009.

The diamonds with plus marks represent parallel splits and joins. The diamonds with X marks represent decisions and 'OR' joins. On the surface the process looks reasonable. A business user might describe the process 100 as follows. If everything is acceptable after Activity One, we do Activity Five and finish. Otherwise, we do Activity Two followed by Activity Three and Activity Four in parallel. With Activity Three done, we can do Activity Five, With Activity Four done, if all is okay, we can do Activity Six. If the check after Activity Four fails, we start over.

However, it is realized that the process 100 of FIG. 1 represents undesirable behavior on three fronts: (1) one or more scripts used to implement the process contain deadlocks; (2) one or more scripts used to implement the process contain synchronization faults; and (3) one or more scripts used to implement the process contain a potentially infinite loop.

A soundness check on the process 100 would detect the following errors. First, if the test after Activity One passes immediately, the process will deadlock waiting for Activity Three. If the test after Activity One fails immediately, and the test after Activity Four passes, the process will deadlock waiting for Activity Five. Whenever the decision test after Activity Four fails, the process creates an "extra" execution of Activity Three that will be left dangling if the process eventually completes. The process will loop indefinitely, creating infinite dangling executions of Activity Three, when the branches after Activity One and Activity Four both always evaluate to 'No'.

While the flaws in the process 100 may be evident to a computer scientist experienced with Petri Nets, and to a software engineer familiar with parallel programming, they may not be readily evident to a web designer. Furthermore, a business executive thinking in terms of "what needs to be done when" will likely not notice any problems in the process 100.

Figure 2:
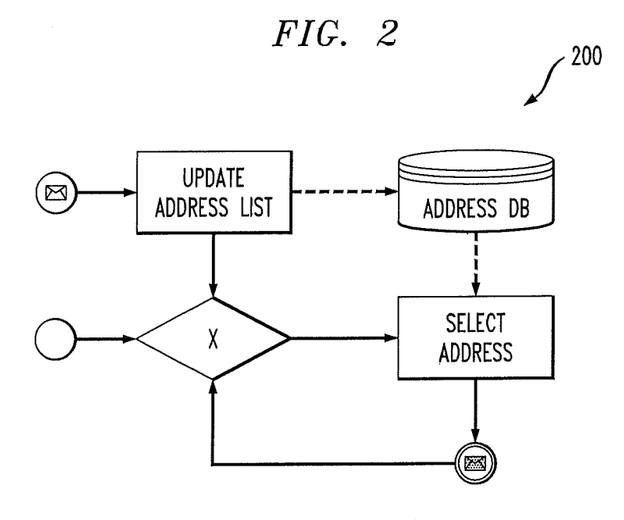
FIG. 2 illustrates an example of a process which contains one or more scripts that may result in malicious behavior.

FIG. 2 illustrates an example of a process which contains one or more scripts that may result in malicious behavior. More particularly, FIG. 2 demonstrates a process 200 that loops indefinitely while generating messages. The messages contain links to sites that install malware to send more messages that create new process instances. The malware messages contain new email addresses. On receipt of the malware messages, the process updates the address database and continues to loop. Neither the initial process nor the processes instantiated by incoming messages will terminate. Thus, this script represents a process explosion as well.

Advantageously, as will be described in detail herein, principles of embodiments of the invention limit the execution of a scripting language within a hosted environment to expressions considered safe. That is, principles of embodiments of the invention provide methods and systems that limit execution of scripts that may cause undesirable and malicious behavior, including but not limited to the behaviors described above in the context of FIGS. 1 and 2. Furthermore, principles of embodiments of the invention generate configurations that specify which expressions are considered unsafe, and then prevent their execution. Unsafe scripting expressions or constructs that may be limited/prevented may include, but are not limited to, 'function call', 'function definition', 'goto', 'while', 'for', 'property read', and 'property write'. Specifically for JavaScript™, the limited/prevented constructs may also include 'prototype assignment'.

As mentioned above, JavaScript™ is one of the languages commonly enabled for script activities and specifying expressions in business processes. JavaScript™ is far more dangerous than a language such as XPATH because JavaScript™ supports looping, 'function definition', and 'function call'. JavaScript™ not only has structured loops and recursion as potential sources for unbounded execution, but also the 'goto' construct.

In accordance with illustrative embodiments of the invention, a system and methodology are provided for static checking of programs developed with JavaScript™ for potential unbounded behavior. This approach comprises checking for the loop potential constructs in the code and flagging the constructs if they occur. In one embodiment, a configuration file is set up that specifies that 'for', 'while', 'goto', and 'function call' constructs get flagged on a traversal of a parse tree created for the subject program code. This will be explained in greater detail below in the context of FIG. 4.

As is well known in terms of computer programming environments, "flagging" typically refers to assigning an indicator to the program code that represents a status of some part of the program code. A "flag" can be implemented as one or more bits in the code and can be set or unset based on some condition. In one embodiment, a bit associated with the unsafe constructs gets set to indicate it is identified as a construct to be avoided, limited or suppressed, i.e., not executed.

It is further realized that a second source of difficulty with JavaScript™ is function overloading through prototype assignment. A simple call to a string length function, for example, might cause execution of anything but string length, if some earlier code assigned a different function in the string prototype. Thus, in one embodiment, potential function overloading is flagged by detecting assignment to prototype, and 'function definition' is therefore flagged.

Flagging JavaScript™ constructs in this manner, principles of embodiments of the invention can detect whether JavaScript™ usage in a process expression is of the more benign arithmetic evaluation sort, or if it is of the more potentially dangerous program execution sort. Function calls are generally not a problem in expression evaluation provided they are not infinitely recursive. Function calls combined with prototype assignment, on the other hand, represent a real potential hazard.

Figure 3:
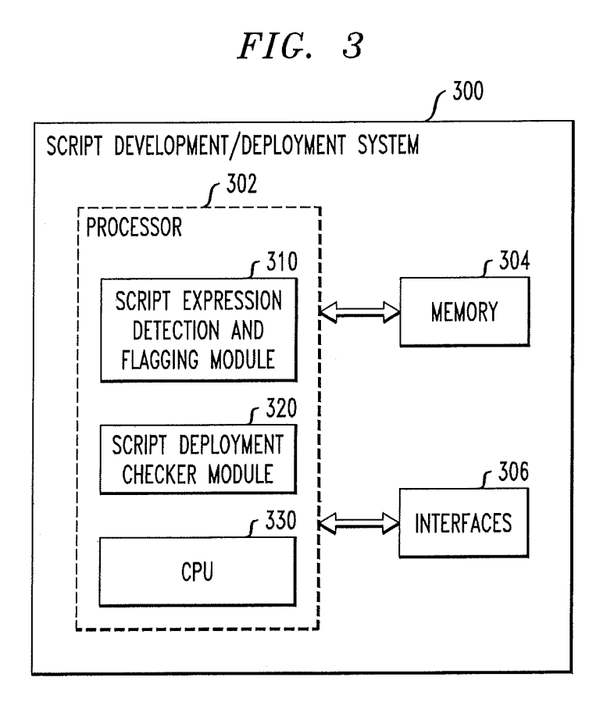
FIG. 3 illustrates a script development/deployment system which limits execution of scripts that may cause undesirable and malicious behavior, according to an embodiment of the invention.

FIG. 3 illustrates a script development/deployment system 300 which limits execution of scripts that may cause undesirable and malicious behavior, according to an embodiment of the invention. It is to be understood that the system 300 is referred to as a script development/deployment system since it can function as a script development system and/or a script deployment system. In deployment mode, the system (methodology) detects undesirable expressions and prevents execution. In development mode, the system (methodology) helps an end user identify any expressions that the deployment will reject. Further, in development mode, the resulting flagged expressions might be highlighted in an editor. Still further, in deployment mode, the flagged expressions might be logged for audit or review.

The system comprises a processor (i.e., processor device) 302, which is coupled to memory 304 and interfaces 306. The processor 302 comprises a script expression detection and flagging module 310 for detecting, in a given input set of program code (e.g., one or more business processes or web pages), the presence of a given set of script expressions (constructs) that are considered unsafe (e.g., undesirable and/or malicious) and thus are to be prevented from being executed. The processor 302 may also comprise a script deployment checker 320 for checking a version of the input program code set prior to deployment. The modules 310 and 320 may execute under the control of a central processing unit (CPU) 330 of the processor.

The processor 302 obtains: (i) a configuration file which specifies which expressions are considered unsafe; and (ii) at least one program to be tested. The processor 302 then processes, via the script expression detection and flagging module 310, the program code based on the configuration file to generate an unsafe expression-flagged version of the input set of program code. The flagged version of the code, or intermediate parts thereof, can be displayed to a user of the system 300 in order that the user may edit the code to remove the unsafe expressions. The script expression detection and flagging methodology will be further illustrated and described below in conjunction with FIG. 4. Furthermore, the flagged version of the program code can be provided to the script deployment checker module 320 which rejects processes with flagged expressions, i.e., prevents scripts with unsafe expressions from being executed in a program.

The processor 302 and one or more additional components of system 300 such as memory 304 and interfaces 306 may be part of a computer, server or other type of processing device. One or more of the modules 310 and 320 in FIG. 3 may be implemented at least in part in the form of software that is stored in memory 304 and executed by processor 302.

The memory 304 is an example of what is more generally referred to herein as a computer program product having embodied therein executable program code, and may comprise electronic memory such as RAM or ROM, magnetic memory, disk-based memory, optical memory or other types of storage elements, in any combination. The processor 302 may comprise one or more microprocessors, microcontrollers, application-specific integrated circuits (ASICs), field programmable gate arrays (FPGAs), graphical processing units (GPUs) or other processing devices, in any combination, for executing program code stored in memory 304. As noted above, the modules 310 and 320 may be implemented at least in part in the form of such program code.

The interfaces 306 may comprise, for example, user interfaces such as displays, keyboards and other input-output devices, as well as network interfaces for interfacing processor 302 with other system elements over one or more networks.

It is to be appreciated that the particular arrangement of the script development/deployment system 300 as shown in FIG. 3 is presented by way of illustrative example only. Alternative embodiments may include other arrangements of system elements suitably configured to support limiting execution of scripts that may result in unsafe (undesirable and/or malicious) behavior in the manner described herein.

The processor 302 and its associated memory 304 or portions thereof may be implemented at least in part in the form of an integrated circuit. For example, in a given implementation the processor 302 may be embodied in a single ASIC or other type of processing device, such as, for example, an FPGA, GPU, computer, server, mobile communication device, etc.

Figure 4:
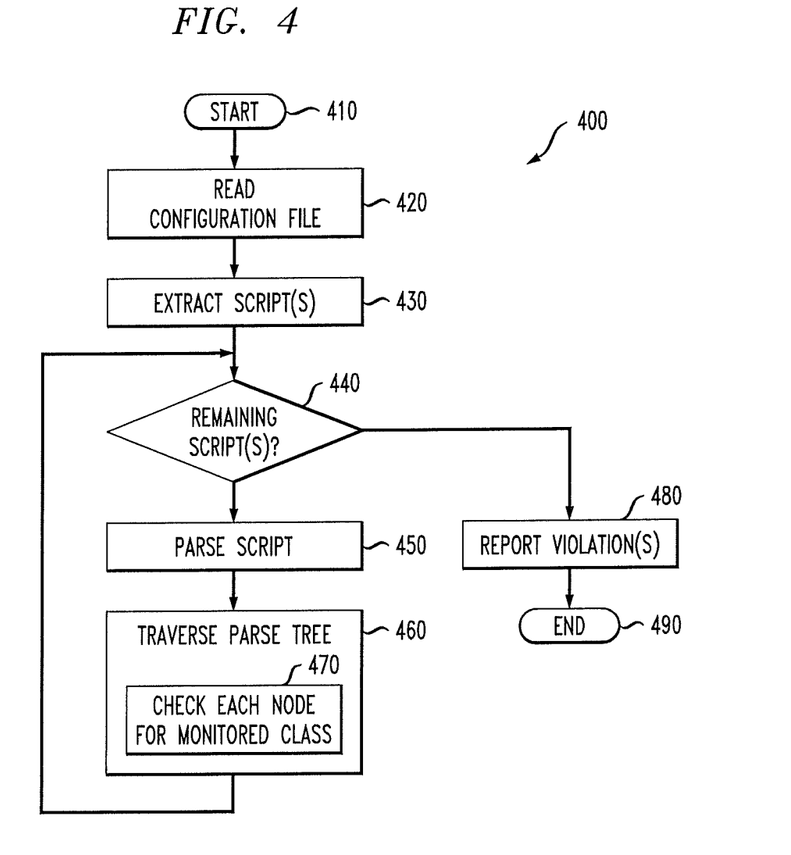
FIG. 4 illustrates a methodology for limiting execution of scripts that may result in undesirable and malicious behavior, according to an embodiment of the invention.

FIG. 4 illustrates a methodology 400 for limiting execution of scripts that may result in undesirable and malicious behavior, according to an embodiment of the invention. That is, FIG. 4 represents an illustrative methodology used to detect unwanted expressions within one or more programs (e.g., business processes or web pages).

The methodology starts at block 410. In step 420, the methodology reads a configuration file that contains monitored classes of expressions such as, for example, those that use looping constructs, function calls, or prototype assignment. That is, as mentioned above, the configuration file may specify, as unsafe, constructs such as, for example, 'function call', 'function definition', 'goto', 'while', 'for', 'property read', and 'property write' and 'prototype assignment'.

In step 430, the methodology extracts the script expressions from the subject software program being tested. Such software program may comprise, for example, one or more business processes or one or more web pages. This is a particularly advantageous step since the methodology 400 is able to automatically extract script expressions from the mixed content that comprises the business process or web page. It is realized that software programs that contain script expressions specifically identify those expressions as such for evaluation. Thus, the methodology 400 may identify script expressions for extraction in the same way that language runtime interpreters detect them for execution. Step 440 is a looping guard that determines whether there are any scripts remaining to check.

In step 450, the methodology converts an individual script or expression into a parsed tree. Parsing and parsed tree generation are well-known techniques in the field of Computer Science, for example, see Aho, Sethi, Ullman, *Compilers: Principles, Techniques, and Tools*, Addison-Wesley, 1986, the disclosure of which is incorporated by reference herein in its entirety. The methodology, in step 460, traverses the entire parsed tree and, for each node in the tree, checks in step 470 whether that node constitutes one of the monitored classes of expressions. After visiting all of the scripts (verified by step 440), the methodology reports any violations in step 480 and exits at block 490. Reporting violations may comprise displaying an error message to a user of the script development/deployment system that shows the user which expressions have been flagged as unsafe. The user can then go back to the program and delete the unsafe expression and replace it with an alternative that could then be rechecked. Also, a flagged version of the program code that is subjected to the methodology 400 can be provided to the script deployment checker module 320 (FIG. 3) which rejects any programs with flagged expressions, i.e., prevents scripts with unsafe expressions from being executed.

Figure 5:
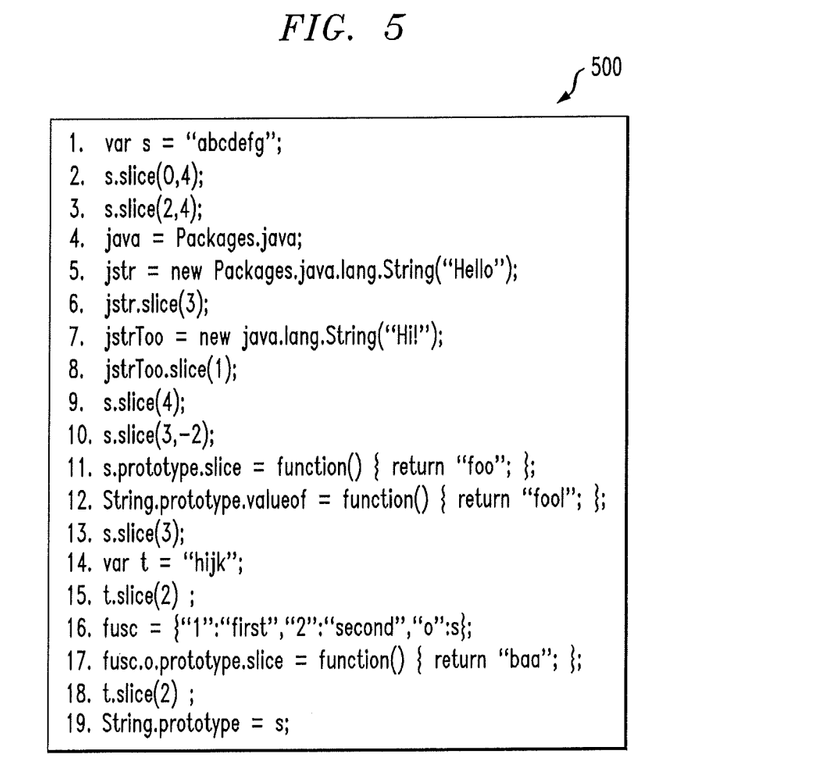
FIG. 5 illustrates an example of a set of program code that contains expressions that may result in undesirable and malicious behavior, according to an embodiment of the invention.

By way of example only, FIG. 5 illustrates a set of program code 500 that contains expressions that may result in undesirable and/or malicious behavior, according to an embodiment of the invention. As illustratively explained above, the set of program code 500 includes potentially dangerous expressions such as JavaScript™ expressions, function call expressions, and prototype assignment expressions, all of which may possibly cause undesirable and/or malicious behavior when executed.

Figure 6:
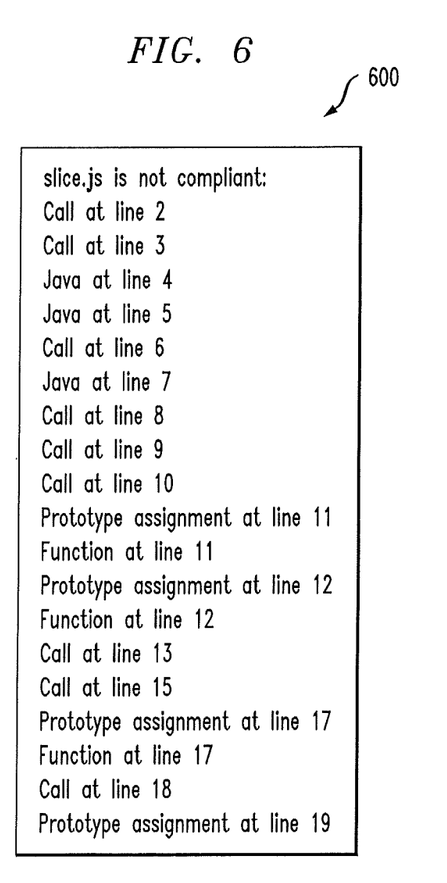
FIG. 6 illustrates an example of a list displayed to a user indicating expressions in the program code of FIG. 5 that have been flagged, according to an embodiment of the invention.

In accordance with the execution of methodology 400 in FIG. 4, FIG. 6 illustrates an example of a list 600 displayed to a user indicating expressions in the program code 500 of FIG. 5 that have been flagged. That is, the list 600 is an example of a result generated by the execution of methodology 400 on program code 500. Thus, note that the line number references in list 600 correspond to the line numbers of the software code set 500 in FIG. 5. It is to be appreciated that the examples given in FIGS. 5 and 6 are for illustration purposes only, and that simpler or more complex programs may be processed in accordance with principles of embodiments of the invention.

As will be appreciated by one skilled in the art, embodiments of the invention may be embodied as a system, method or computer program product. Accordingly, embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the invention may take the form of a computer program product embodied in one or more computer readable medium(s) having computer readable program code embodied thereon. A given computer readable medium of this type may be part of or otherwise associated with a processor such as the above-noted ASICs or FPGAs.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, RAM, ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). A given computer or server may comprise one or more processors, such as the above-noted GPUs.

Embodiments of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should therefore again be emphasized that the various embodiments described herein are presented by way of illustrative example only, and should not be construed as limiting the scope of the invention. For example, alternative embodiments of the invention can utilize different scripting languages and script development/deployment system configurations, than those described above in the context of the illustrative embodiments. These and numerous other alternative embodiments within the scope of the appended claims will be readily apparent to those skilled in the art.

What is claimed is:

1. An apparatus comprising:
a memory; and
a processor device operatively coupled to the memory and configured to: generate a configuration file comprising one or more constructs predetermined to be unsafe for execution as identified by a user; extract a first set of program code from a second set of program code;
parse the extracted first set of program code to generate a parsed structure;
examine the parsed structure generated from the first set of program code for one or more expressions that use at least one of the one or more constructs predetermined to be unsafe for execution, wherein the examination further comprises providing a looping guard to verify if the entire first set of program code has been examined;
detect the one or more expressions that use at least one of the one or more constructs predetermined to be unsafe for execution that are contained in the first set of program code, wherein the detecting step further comprises flagging each of the one or more expressions that use at least one of the one or more constructs predetermined to be unsafe for execution that are contained in the first set of program code; and
generate an unsafe-expression flagged version of the first set of program code for editing by a user.

2. The apparatus of claim 1, wherein the processor device is further configured to display the one or more expressions that use at least one of the one or more constructs predetermined to be unsafe for execution that are contained in the first set of program code.

3. The apparatus of claim 1, wherein the processor device is further configured to prevent execution of the one or more expressions that use at least one of the one or more constructs predetermined to be unsafe for execution that are contained in the first set of program code while allowing execution of at least one of: any remaining portion of the first program code without the one or more expressions; and the second program code, to execute.

4. The apparatus of claim 1, wherein the processor device is further configured to prevent execution of the second set of program code when at least one of the one or more expressions that use at least one of the one or more constructs predetermined to be unsafe for execution are detected in the first set of program code.

5. The apparatus of claim 1, wherein the parsed structure comprises a parsed tree structure.

6. The apparatus of claim 1, wherein the second set of program code comprises a business process.

7. The apparatus of claim 1, wherein the second set of program code comprises a web page.

8. The apparatus of claim 1, wherein the first set of program code comprises a segment of code generated using a scripting language.

9. The apparatus of claim 1, wherein the one or more expressions that use at least one of the one or more constructs predetermined to be unsafe for execution comprise one or more of: a function call construct; a function definition construct; a goto construct; a while construct; a for construct; a property read construct; a property write construct; and a prototype assignment construct.

10. The apparatus of claim 1, wherein the second set of program code is deployable in a shared computing environment.

11. An article of manufacture comprising a non-transitory computer readable storage medium having tangibly embodied thereon computer readable program code which, when executed, causes a processor device to: generate a configuration file comprising one or more constructs predetermined to be unsafe for execution as identified by a user;
extract a first set of program code from a second set of program code;
parse the extracted first set of program code to generate a parsed structure;
examine the parsed structure generated from the first set of program code for one or more expressions that use at least one of the one or more constructs predetermined to be unsafe for execution, wherein the examination further comprises providing a looping guard to verify if the entire first set of program code has been examined;
detect the one or more expressions that use at least one of the one or more constructs predetermined to be unsafe for execution that are contained in the first set of program code, wherein the detecting step further comprises flagging each of the one or more expressions that use at least one of the one or more constructs predetermined to be unsafe for execution that are contained in the first set of program code; and
generate an unsafe-expression flagged version of the first set of program code for editing by a user.

12. The apparatus of claim 1, wherein editing by a user comprises at least one of removing the one or more expressions that uses at least one of the one or more constructs predetermined to be unsafe for execution and replacing the one or more expressions with one or more alternative expressions.

13. The apparatus of claim 5, wherein the parsed tree structure comprises one or more nodes.

14. The apparatus of claim 13, wherein the processor device is further configured to traverse the parsed tree structure and check each of the one or more nodes for the one or more expressions predetermined to be unsafe for execution that are contained in the first set of program code.

* * * * *